US011224060B2

(12) United States Patent
Zhou et al.

(10) Patent No.: US 11,224,060 B2
(45) Date of Patent: Jan. 11, 2022

(54) GAP TRANSMISSION IN CHANNEL OCCUPANCY TIME

(71) Applicant: QUALCOMM Incorporated, San Diego, CA (US)

(72) Inventors: Yan Zhou, San Diego, CA (US); Tao Luo, San Diego, CA (US); Makesh Pravin John Wilson, San Diego, CA (US); Arumugam Chendamarai Kannan, San Diego, CA (US); Xiaoxia Zhang, San Diego, CA (US); Jing Sun, San Diego, CA (US); Srinivas Yerramalli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 161 days.

(21) Appl. No.: 16/654,435

(22) Filed: Oct. 16, 2019

(65) Prior Publication Data

US 2020/0196336 A1 Jun. 18, 2020

Related U.S. Application Data

(60) Provisional application No. 62/780,165, filed on Dec. 14, 2018.

(51) Int. Cl.
*H04W 72/12* (2009.01)
*H04W 16/14* (2009.01)

(52) U.S. Cl.
CPC ....... *H04W 72/1273* (2013.01); *H04W 16/14* (2013.01); *H04W 72/1289* (2013.01)

(58) Field of Classification Search
CPC ............ H04W 16/14; H04W 72/1273; H04W 72/1289
See application file for complete search history.

(56) References Cited

U.S. PATENT DOCUMENTS

2016/0227545 A1   8/2016 Yang et al.
2018/0220459 A1 * 8/2018 Park ...................... H04W 48/10
(Continued)

FOREIGN PATENT DOCUMENTS

CN   112913172 A * 6/2021 ........... H04L 5/0055
GB   2577510 A * 4/2020 ........... H04L 5/0094
(Continued)

OTHER PUBLICATIONS

LTE on License-Exempt Spectrum; Jingjing Zhang, Mao Wang, Min Hua, Tingting Xia, Wenjie Yang, and Xiaohu You, Fellow, IEEE IEEE Communications Surveys & Tutorials, vol. 20, No. 1, First Quarter 2018 647 (Year: 2018).*
(Continued)

*Primary Examiner* — Deepa Belur
(74) *Attorney, Agent, or Firm* — Procopio, Cory, Hargreaves & Savitch LLP

(57) ABSTRACT

A method, a computer-readable medium, and an apparatus are provided that improves the reliability of communication between a base station and a user equipment (UE) using an unlicensed spectrum. A base station transmits an initial signal (IS) to the UE indicating communication to the UE within a Channel Occupancy Time (COT), and transmits a gap transmission during the COT over a time period following the IS and prior to transmitting the communication to the UE.

28 Claims, 8 Drawing Sheets

(56) References Cited

U.S. PATENT DOCUMENTS

2018/0343670 A1* 11/2018 Park .................. H04W 72/1289
2019/0159256 A1* 5/2019 Talarico ................ H04L 1/1887

FOREIGN PATENT DOCUMENTS

WO    WO-2018062966 A1 * 4/2018    ........ H04W 72/0453
WO    WO-2018071853 A1 * 4/2018    ........... H04L 1/1887
WO    WO-2020029249 A1 * 2/2020    ........ H04W 52/0229

OTHER PUBLICATIONS

Huawei, et al., "DL Channels and Signals in NR Unlicensed Band", 3GPP Draft, 3GPP TSG RAN WG 1 Meeting #94bis, R1-1810124, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8,2018-Oct. 12, 2018, Sep. 29, 2018 (Sep. 29, 2018), XP051517539, 7 pages, Retrieved from the Internet:URL: http://www.3gpp.org/ftp/tsg%5Fran/WG1%5FRL1/TSGR1%5F94b/Docs/R1%2D1810124%2Ezip [retrieved on Sep. 29, 2018], the whole document.
International Search Report and Written Opinion—PCT/US2019/056787—ISA/EPO—dated Jan. 24, 2020.

* cited by examiner

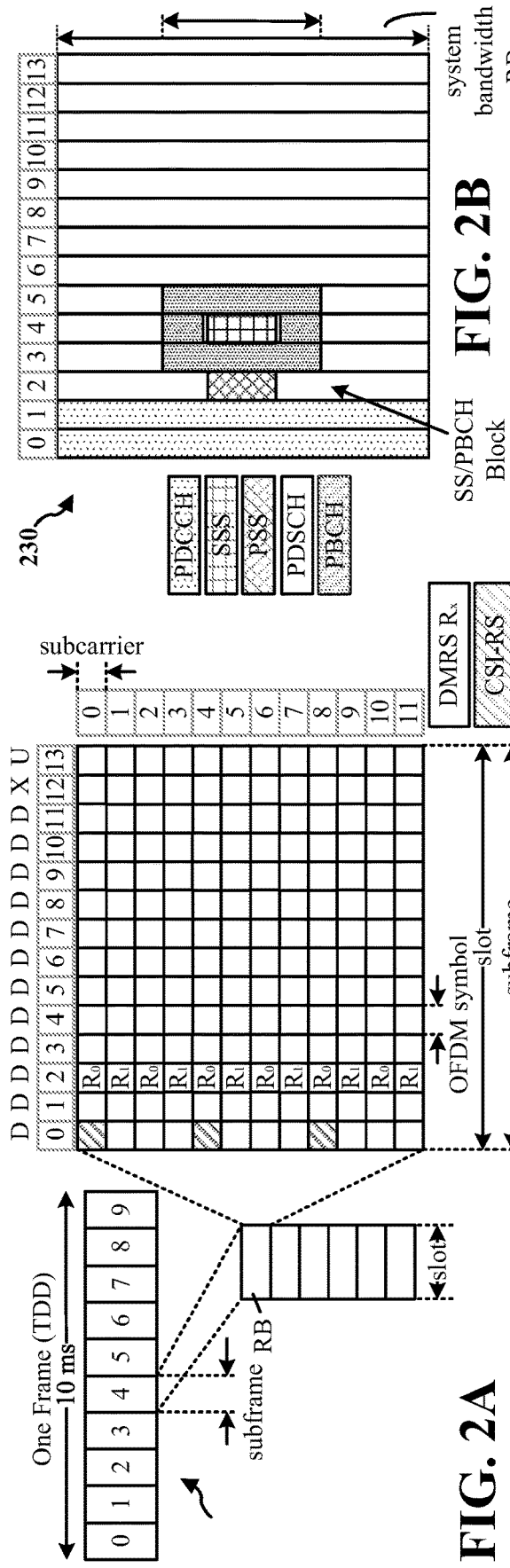
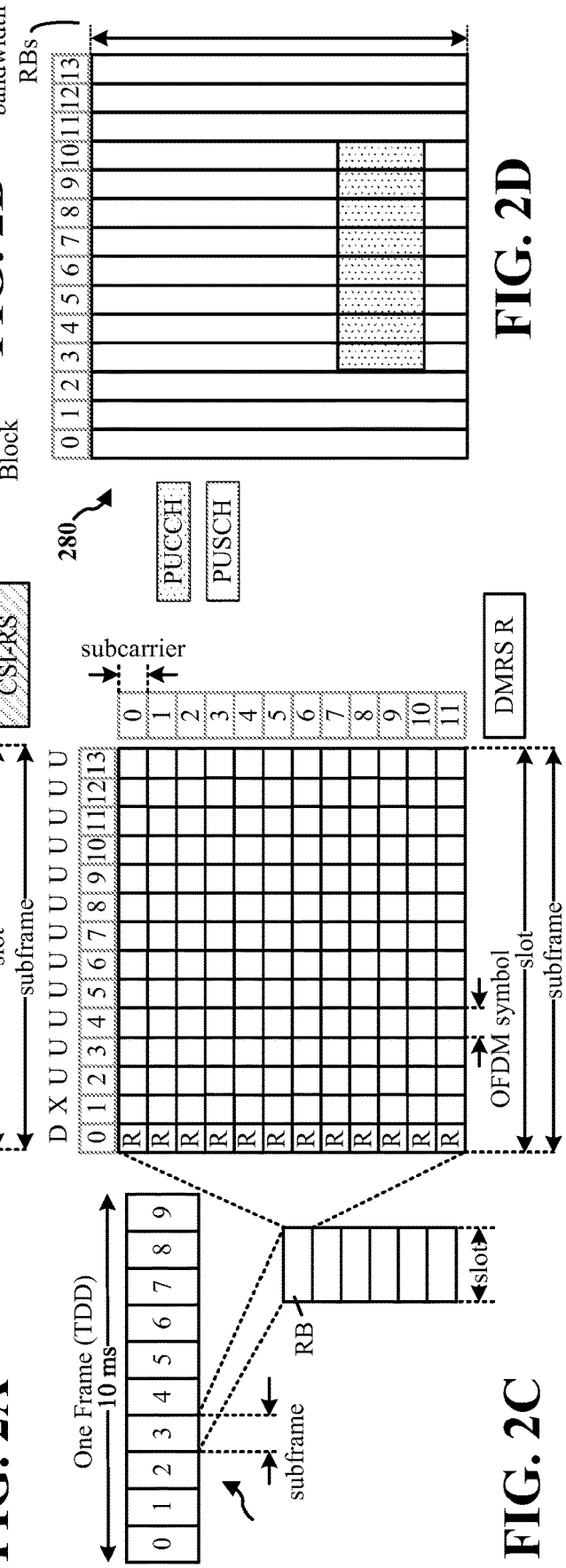
FIG. 2A  FIG. 2B  FIG. 2C  FIG. 2D

GAP TRANSMISSION IN CHANNEL OCCUPANCY TIME

CROSS-REFERENCE TO RELATED APPLICATION(S)

This application claims the priority of U.S. Provisional Application Ser. No. 62/780,165, entitled "GAP TRANSMISSION IN CHANNEL OCCUPANCY TIME" and filed on Dec. 14, 2018, the disclosure of which is expressly incorporated by reference herein in their entirety.

BACKGROUND

Technical Field

The present disclosure relates generally to communication systems, and more particularly, to wireless communication in an unlicensed spectrum.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Wireless communication between a base station and a User Equipment (UE) in an unlicensed spectrum may be performed during a Channel Occupancy Time (COT) following a successful Clear Channel Assessment (CCA) by the base station. Once the base station determines that the channel is clear for use by the base station, the base station may transmit an initial signal (IS) that informs the UE to monitor for further communication from the base station. The UE may require an amount of time to decode the IS before the UE is ready to monitor for the following communication from the base station. For a period of time following the IS, the UE may not be ready to monitor for communication from the base station. Thus, the base station may wait for a period of time following the IS before the base station begins transmitting communication to the UE. The period of time may be based on the time for the UE to decode the IS. However, other nodes may occupy the medium if the base station does not transmit any signal during this decoding period. The base station may lose the medium as a result. In order to overcome this problem and to avoid the medium being occupied by other nodes, the present application provides an improvement in which the base station transmits a gap transmission, during the period following the IS to the UE and prior to communicating with the UE. Aspects presented herein improve communication reliability by helping to ensure that the base station maintains occupation of the medium during the COT.

In an aspect of the disclosure, a method, a computer-readable medium, and an apparatus are provided. The apparatus may be a base station, for example. The apparatus may be configured to transmit an IS to a UE indicating communication to the UE within a COT. The apparatus may be configured to transmit a gap transmission during the COT over a time period between the IS and the communication to the UE. The apparatus may be configured to transmit the communication to the UE during the COT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
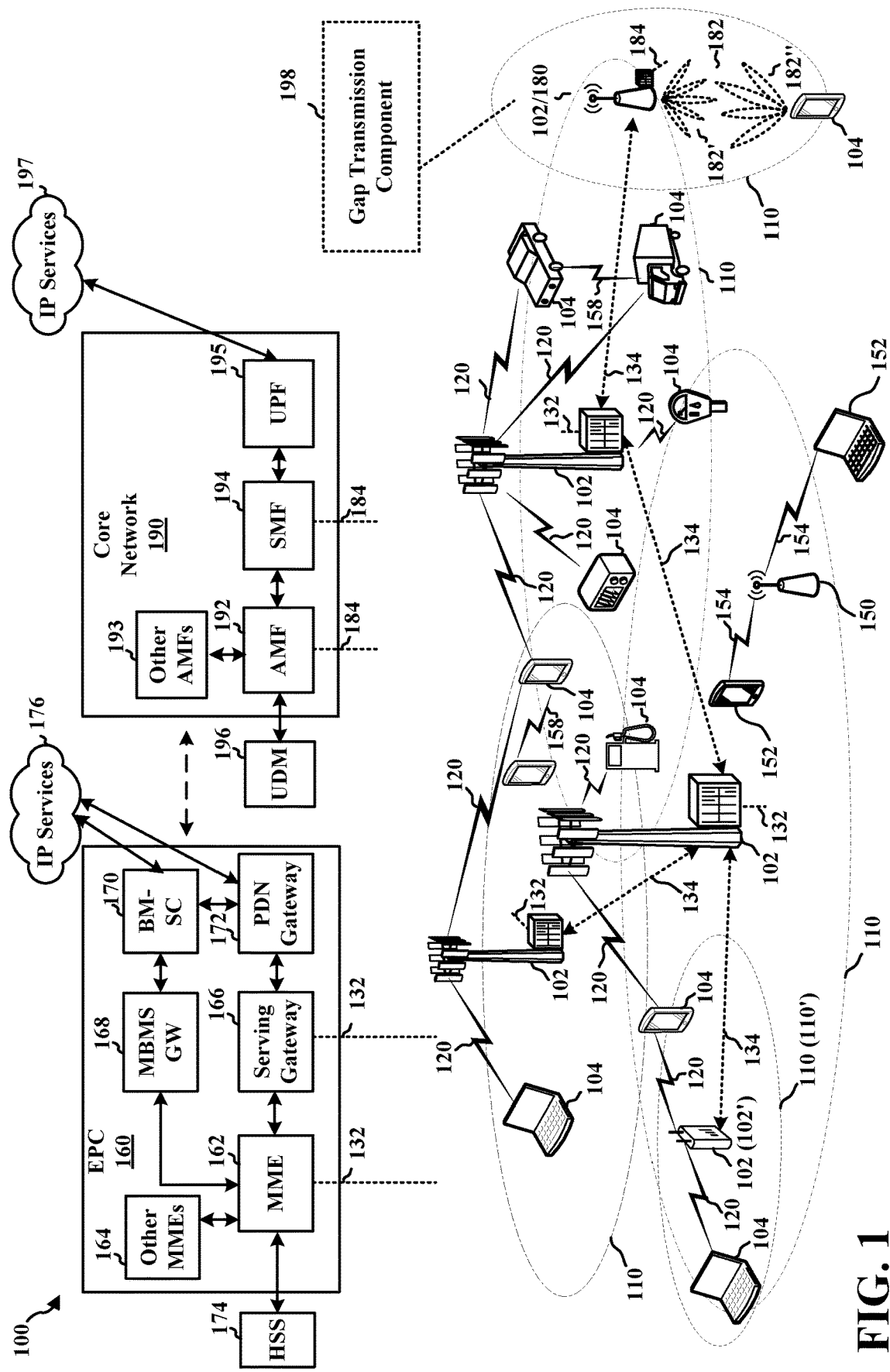
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, such as base station 180, may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 may be configured to transmit an IS to the UE 104 indicating upcoming communication for the UE 104 within a COT. The base station 102/180 may include a gap transmission component 198 that is configured to transmit a gap transmission during the COT over a time period between the IS and the transmission of the communication to the UE 104. The base station 102/180 may be further configured to transmit the communication to the UE 104 during the COT following the gap transmission. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
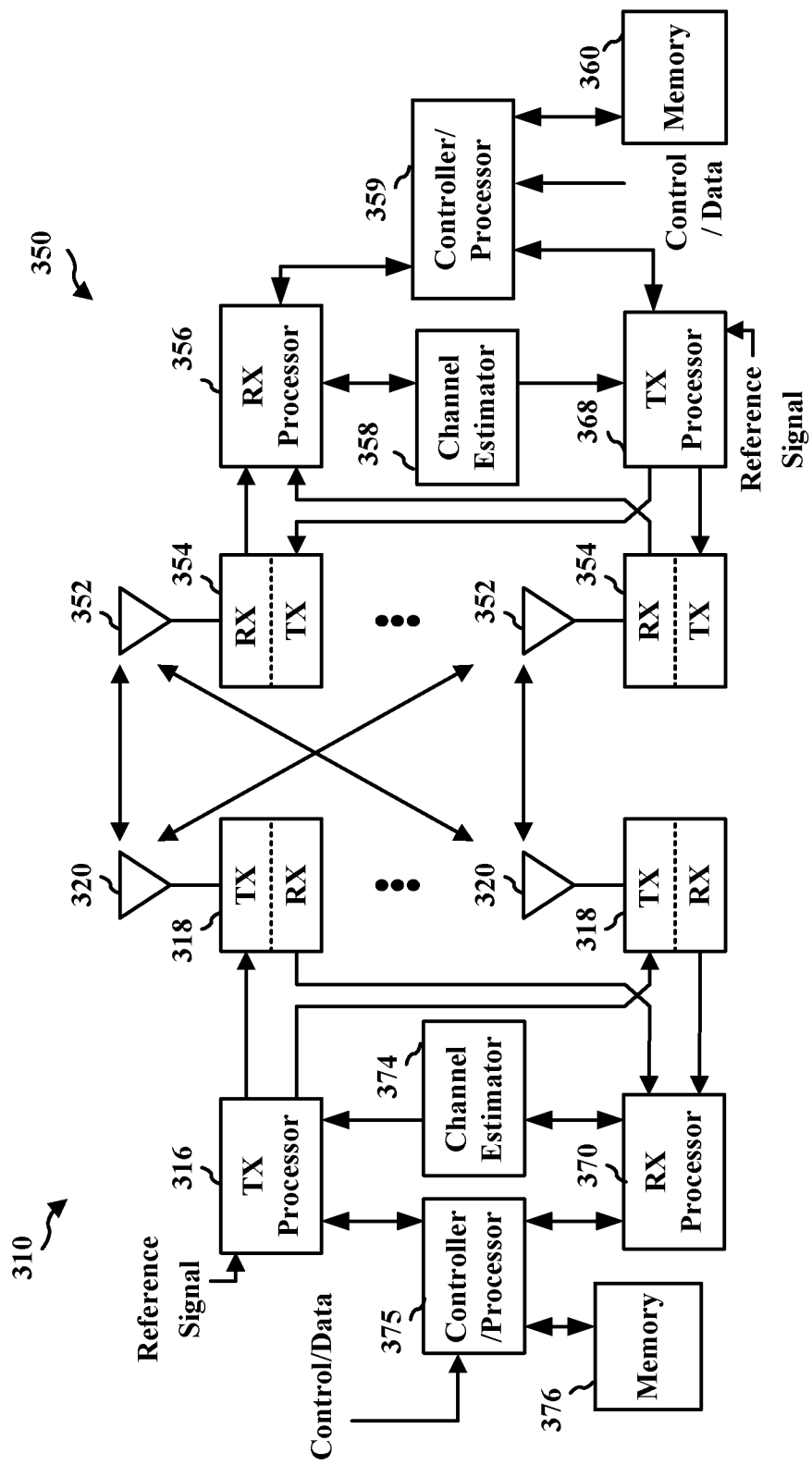
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. At least one of the TX processor 316, the RX processor 370, and the controller/processor 375 may be configured to perform aspects in connection with 198 of FIG. 1.

Figure 4:
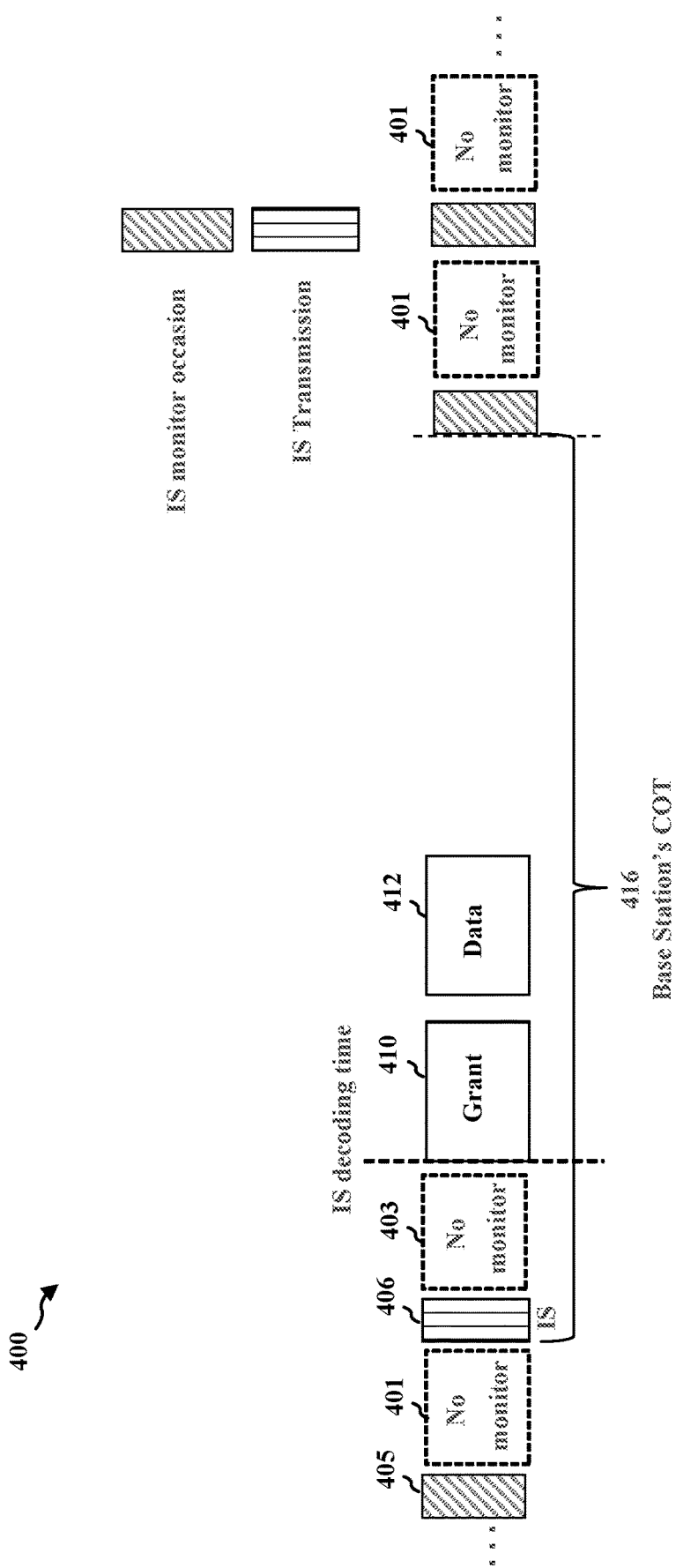
FIG. 4 is a diagram illustrating communication from a base station including a COT.

In unlicensed bands where the transmission medium is generally shared among multiple devices (e.g. 60 GHz), a base station may perform a clear channel assessment (CCA) to determine if the medium is available for use by the base station. If the CCA clears (i.e. the base station is successful in its contention for the medium), the base station is able to use the channel for the duration of a COT to schedule grants and transmit data to/receive data from one or more UEs. FIG. 4 illustrates an example diagram 400 including initial signal (IS) monitor occasions and a COT corresponding to an IS transmission. The base station transmits an IS 406 informing the UE that the base station controls the medium, e.g., at the beginning of the COT 416. The IS 406 may inform the UE to monitor for communication from the base station during the COT 416. The COT 416 may comprise a duration of time during which the base station may occupy the medium by transmitting and/or receiving communication. For example, the communication may include a grant 410 and/or the data 412 that is transmitted during the COT 416. The grant 410 may comprise a grant for DL data, and the data 412 may comprise DL data transmitted from the base station to the UE according to the grant 410. In another example, the grant 410 may comprise a grant for UL data from the UE, and the data 412 may comprise an UL data transmission from the UE according to the grant. The IS 406 may inform the UE that the base station will use the COT 416. For example, the IS 406 may comprise a Group Common Physical Downlink Control Channel (GC-PDCCH), a CSI-RS, or other reference signal at a beginning of the COT 416. Although only a single grant 410 and data 412 are illustrated, the base station may communicate multiple grants and multiple data transmissions during the COT. The base station may communicate with more than one UE during the COT. In general, a UE might not monitor for communication from the base station outside of the IS monitor occasions if the UE does not detect the COT 416, e.g., as illustrated at 401. FIG. 4 illustrates multiple IS monitor occasions 405. If the UE does not detect the COT 416, the UE may limit monitoring to the IS monitor occasions 405 and may not monitor outside the IS monitor occasions 405. As well, after the UE detects an indication of the COT 416 that the base station indicates in the IS 406, the UE may need certain time to decode the IS 406 indicating the COT 416 before the UE is ready to receive additional communication from the base station. Thus, during a period 403, the UE might not monitor for communication while the UE decodes the IS 406.

Thus, the UE may not monitor from the end of the IS 406 until after the IS 406 is decoded and may not decode any data scheduled during that decoding time period, e.g., 403. Therefore, the base station may wait to schedule data transmissions for the UE until after the IS 406 is decoded by the UE. However, other base stations or nodes may occupy the medium (e.g., the channel(s) corresponding to the COT of the base station) if the base station does not transmit any signal in this time period between the end of the IS 406 and the time at which the UE finishes decoding the IS 406 (e.g., during the time period illustrated as 403). The base station may lose the medium (e.g., the channel(s) corresponding to the COT indicated in the IS) based on transmissions from the other base station or node. The loss of the medium while the base station waits for the UE to decode the IS may result in degraded system performance and may decrease communication reliability.

Figure 5:
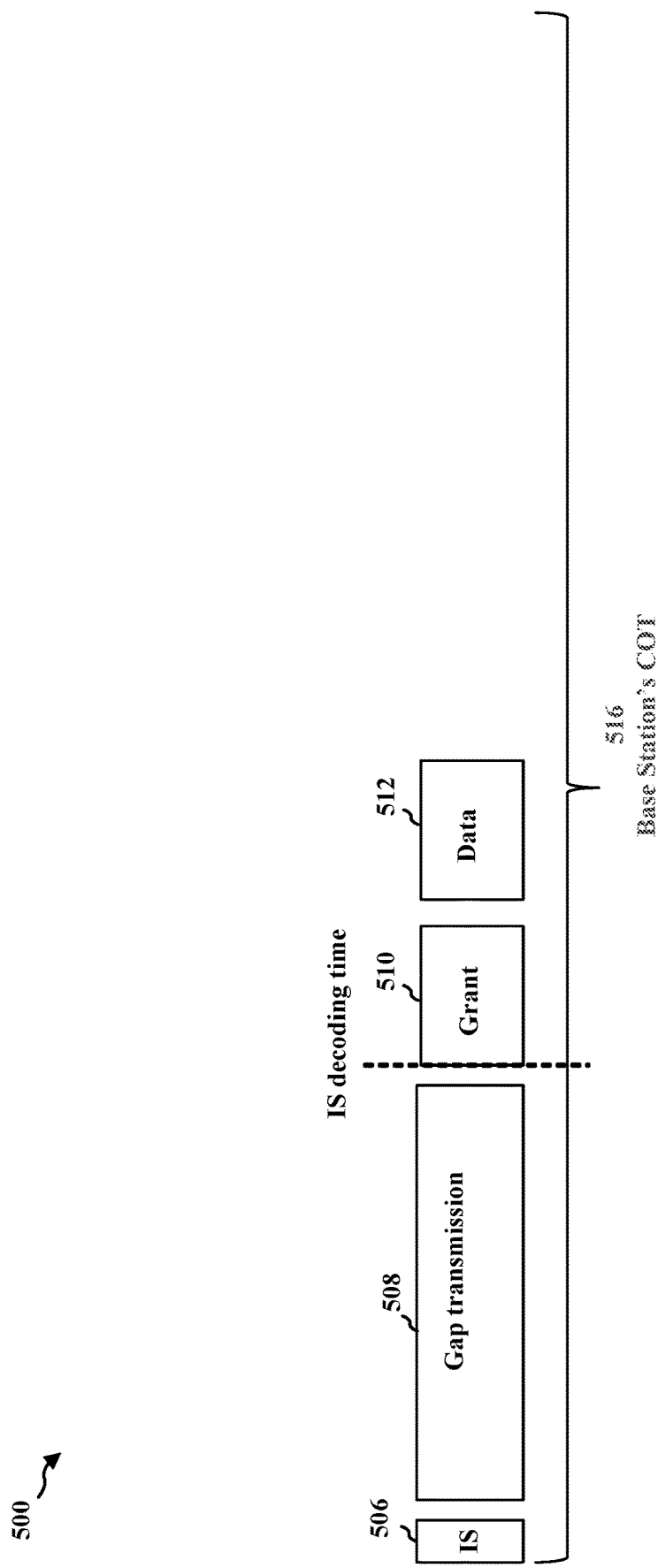
FIG. 5 is a diagram illustrating an example of a communication include a gap transmission during a COT.

FIG. 5 is a diagram 500 illustrating an example of a solution to improve wireless communication reliability by transmitting a gap transmission 508. A base station may transmit an IS 506 (e.g., similar to 406 in FIG. 4) to one or more UEs, indicating that the base station will send communication to the UE(s) within a COT 516. The communication may include at least one grant 510 and/or at least one data transmission 512 that is transmitted during the COT 516. For example, for multiple UEs, the base station may send each of the UEs an individual grant and/or individual data transmissions. The data 512 may comprise UL data and/or DL data according to the grant 510. For example, the IS 506 may inform the UE(s) that the base station has obtained the medium for the COT 516, and may indicate for the UE(s) to wake up to get ready for communication during the COT 516.

To avoid the medium (e.g., the channel(s) corresponding to the COT) from becoming occupied by another base station or other nodes, the base station may transmit a gap transmission 508 during the time period between the end of IS 506 and the communication (e.g., grant 510 or data 512). The gap transmission may assist the base station in maintaining the medium. For example, the time period of the gap transmission 508 may comprise a duration that at least partially overlaps with the time period for the UE(s) to decode the IS 506.

In some aspects, the gap transmission 508 may comprise a repetition of the IS 506. For example, the gap transmission 508 may comprise a repetition of the GC-PDCCH, CSI-RS, or other reference signal.

In some aspects, the gap transmission 508, may comprise information related to an operation in the COT 516. For example, the gap transmission 508 may include the UE IDs for each of multiple UEs to wake up during the COT 516. For example, the gap transmission 508 may include a corresponding on-period schedule during the COT 516 for each of the multiple UEs. As an example, a first UE may need to wake up in a first time window during the COT 516, and a second UE may need to wake up in a second time window during the COT 516. As another example, a first UE may have a first time window for an on period for the communication during the COT 516, and a second UE may need to wake up in a second time window for an on period for the communication during the COT 516.

In some aspects, the gap transmission 508 may comprise information that is not specific to the operation in the COT 516. For example, the gap transmission 508 may include system information for the base station.

Although described as an IS 506, the signal that indicates to the UE to monitor for further communication during the COT may be referred to with a different name. The IS may correspond to any signal that includes information for the UE to receive scheduled data, e.g., on an unlicensed spectrum. For example, the IS 506 may indicate which CORESET may be used in the COT as a result of a listen before talk (LBT) procedure. For example, different CORESET resources may correspond to different beams. The base station may perform LBT or CCA for only a subset of the beams. Thus, the base station may have acquired the medium only to transmit from the subset of beams and might not transmit using the full selection of CORESETs. For example, the IS 506 may include which CORESETs' Quasi Co-Location (QCL) assumptions may be used in the COT as a result of LBT procedure. For example, the IS 506 may include which beams may be used in the COT as a result of the LBT procedure. Aspects presented herein improve communication reliability by the base station transmitting the gap transmission 508 during the COT 516 over a time period between the IS 506 and a communication (such as grant 510) to the UE.

Figure 6:
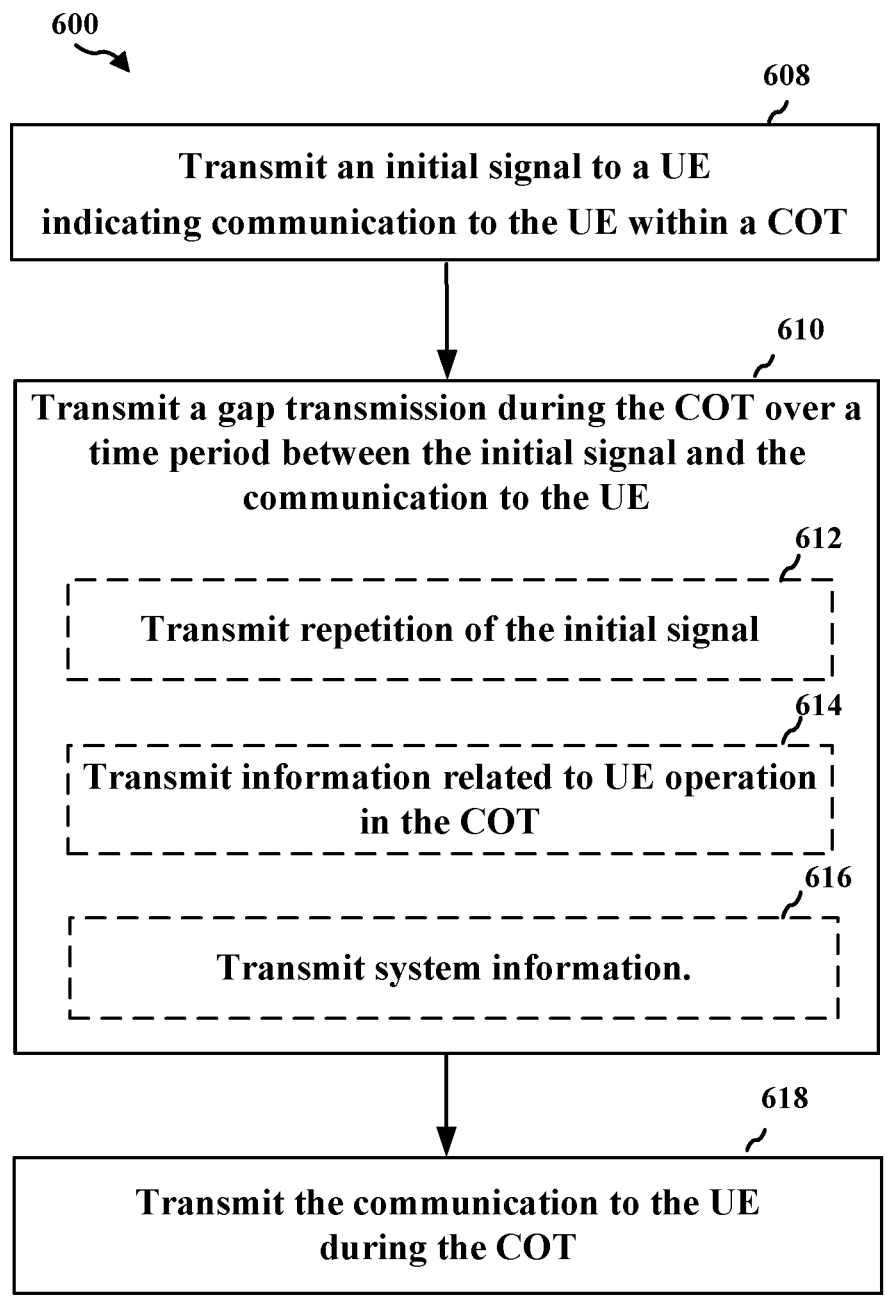
FIG. 6 is a flowchart of a method of wireless communication.

FIG. 6 is a flowchart 600 of a method of wireless communication at a base station. The method may be performed, for example, by a base station or a component of a base station (e.g., the base station 102, 180, 310; the apparatus 702/702'; the processing system 814, which may include the memory 376 and which may be the entire base station or a component of the base station, such as the TX processor 316, the RX processor 370, and/or the controller/processor 375). To facilitate an understanding of the techniques and concepts described herein, the method of flowchart 600 may be discussed with reference to the examples illustrated in FIG. 5. Optional aspects are illustrated in dashed lines. The method may improve communication reliability by the base station through a gap transmission that is transmitted during a COT over a time period between an IS and a communication to one or more UEs.

At 608, the base station may transmit an IS to the UE(s) indicating the communication to the UE or multiple UEs within the COT. For example, 608 may be performed by the IS component 708 of the apparatus 702 in FIG. 7. The time period of the gap transmission may correspond to a time period for the UE or multiple UEs to decode the IS. For example, the communication may comprise at least one of a grant or data transmitted to the UE(s) during the COT. For example, referring back to FIG. 5, IS 506 may be transmitted to inform a UE to monitor for grant 510 and/or data 512.

At 610, the base station may transmit a gap transmission during the COT over a time period between the IS and the communication to the UE(s). For example, 610 may be performed by the gap transmission component 710 of the apparatus 702 in FIG. 7. For example, FIG. 5 illustrates an example gap transmission 508 transmitted between the IS and the communication to the UE(s).

In some aspects, the gap transmission may comprise a repetition of the initial signal, as illustrated at 612. For example, the IS may comprise at least one of a GC-PDCCH or a CSI-RS. For example, referring back to FIG. 5, the gap transmission 508 may comprise a repetition of the IS 506. For example, the gap transmission 508 may comprise a repetition of the GC-PDCCH, CSI-RS, or other reference signal.

In some aspects, the gap transmission may comprise information related to UE operation in the COT, as illustrated at 614. For example, the gap transmission may indicate a time period during the COT for the communication to the UE or multiple UEs. For example, the gap transmission may indicate a time period for each of multiple UEs to wake up during the COT and a time period during the COT for communication with each of the multiple UEs. For example, the gap transmission may identify each of the multiple UEs based on a UE identifier (ID). For example, the gap transmission may comprise a first indication of a first time period during the COT for the UE to wake up, and a second indication of a second time period during the COT for a second UE to wake up. For example, referring back to FIG. 5, the gap transmission 508 may include the UE IDs for each of multiple UEs to wake up during the COT 516. For example, the gap transmission 508 may include a corresponding on-period schedule during the COT 516 for each of the multiple UEs. As an example, a first UE may wake up in a first time window during the COT 516, and a second UE may wake up in a second time window during the COT 516. As another example, a first UE may have a first time window for on period for the communication during the COT 516, and a second UE may need to wake up in a second time window for on period for the communication during the COT 516.

In some aspects, the gap transmission may comprise system information, as illustrated at 616. For example, referring back to FIG. 5, the gap transmission 508 may comprise information that is not specific to the operation in the COT 516. For example, the gap transmission 508 may include system information.

In some aspects, the IS may comprise information for the UE(s) to receive the communication. For example, the IS may comprise information indicating at least one CORESET for use in the COT. For example, the IS may comprises information indicating beams for use in the COT. For example, referring back to FIG. 5, the signal that indicates to the UE to monitor for further communication during the COT may correspond to other signals, as well. The IS may correspond to any signal that includes information that the UE may need to receive scheduled data. For example, the IS 506 may indicate which CORESET may be used in the COT as a result of a listen before talk (LBT) procedure. For example, different CORESET resources may correspond to different beams. The base station may perform LBT or CCA for only a subset of the beams. Thus, the base station may have acquired the medium only to transmit from the subset of beams and might not transmit using the full selection of CORESETs. For example, the IS 506 may include which CORESETs' Quasi Co-Location (QCL) assumptions may be used in the COT as a result of LBT procedure. For example, the IS 506 may include which beams may be used in the COT as a result of the LBT procedure. Aspects presented herein improve communication reliability by the base station transmitting the gap transmission 508 during the COT 516 over a time period between the IS 506 and a communication (such as grant 510) to the UE.

At 618, the base station may transmit the communication to the UE(s) during the COT. For example, 618 may be performed by the communication component 712 of the apparatus 702 in FIG. 7. For example, referring back to FIG. 5, the communication may include at least one grant 510 or 410, and/or at least one data transmission 512 or 412 during the COT 516 or 416. For example, for multiple UEs, the base station may send each of the UEs an individual grant and/or individual data transmissions. The data 512 may comprise UL data and/or DL data according to the grant 510.

Aspects presented herein improve communication reliability by the base station transmitting the gap transmission during the COT over the time period between the IS and the communication to the UE or multiple UEs.

Figure 7:
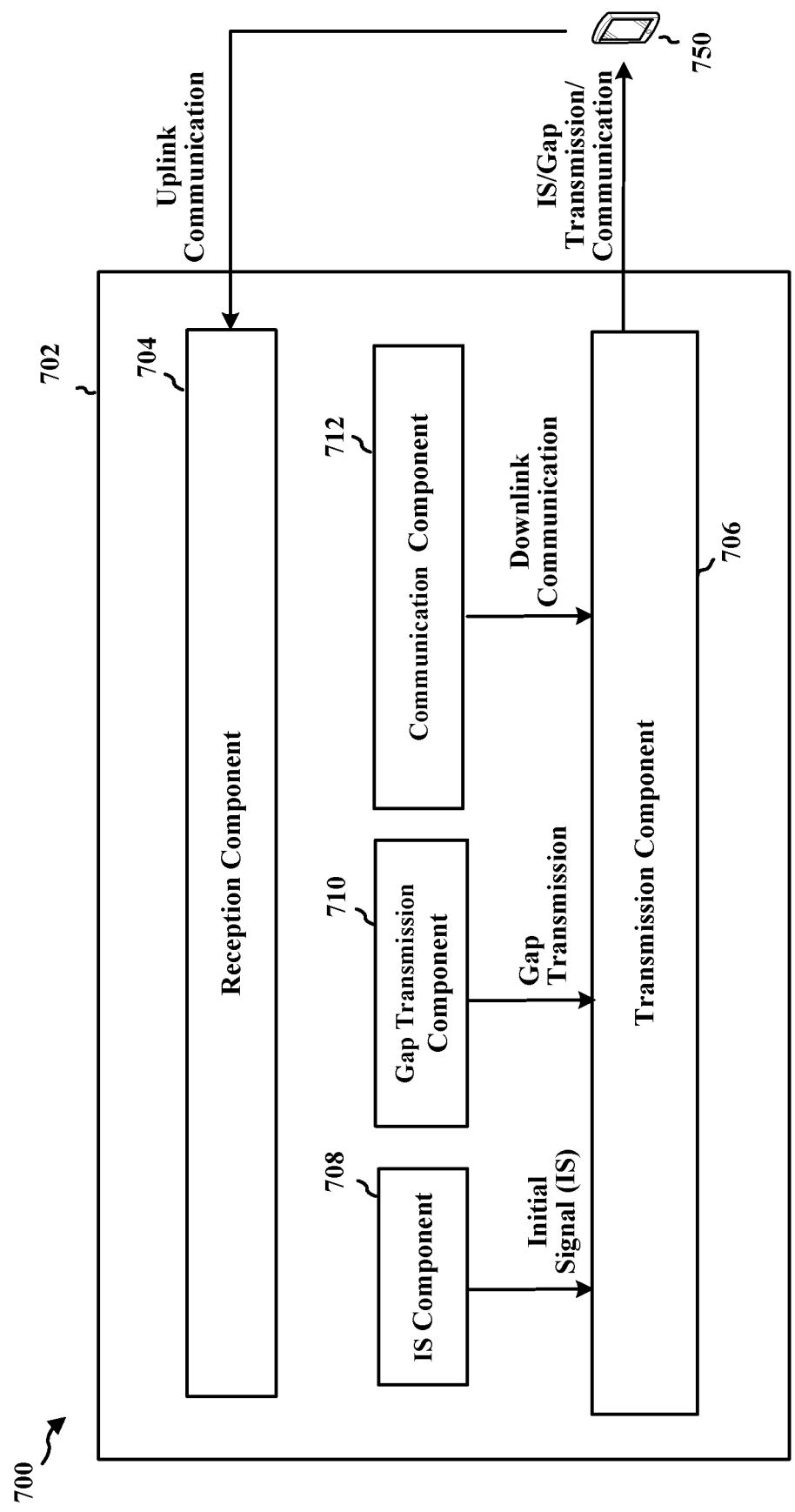
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a base station (e.g., the base station 102/180, 310, which may include the memory 376 and which may be the entire base station or a component of the base station, such as the TX processor 316, the RX processor 370, and/or the controller/processor 375), communicating with one or more UEs. The wireless communication may comprise LTE communication and/or 5G NR communication, as described herein.

The apparatus includes a reception component 704 that is configured to receive communication from one or more UEs 750. The apparatus includes an IS component 708 that is configured to transmit an IS, via a transmission component 706, to the UE or multiple UEs indicating communication to the UE or multiple UEs within a COT, e.g., as described in connection with 608 in FIG. 6. The apparatus includes a gap transmission component 710 that is configured to transmit a gap transmission during the COT, via the transmission component 706, over a time period between the IS and the communication to the UE or multiple UEs, e.g., as described in connection with 610 in FIG. 6. The apparatus includes a communication component 712 that is configured to transmit, via the transmission component 706, the communication to the UE during the COT, e.g., as described in connection with 618 in FIG. 6.

The apparatus may include additional components that perform each of the blocks of the algorithm in the aforementioned flowcharts of FIGS. 5-6. As such, each block in the aforementioned flowcharts of FIGS. 5-6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
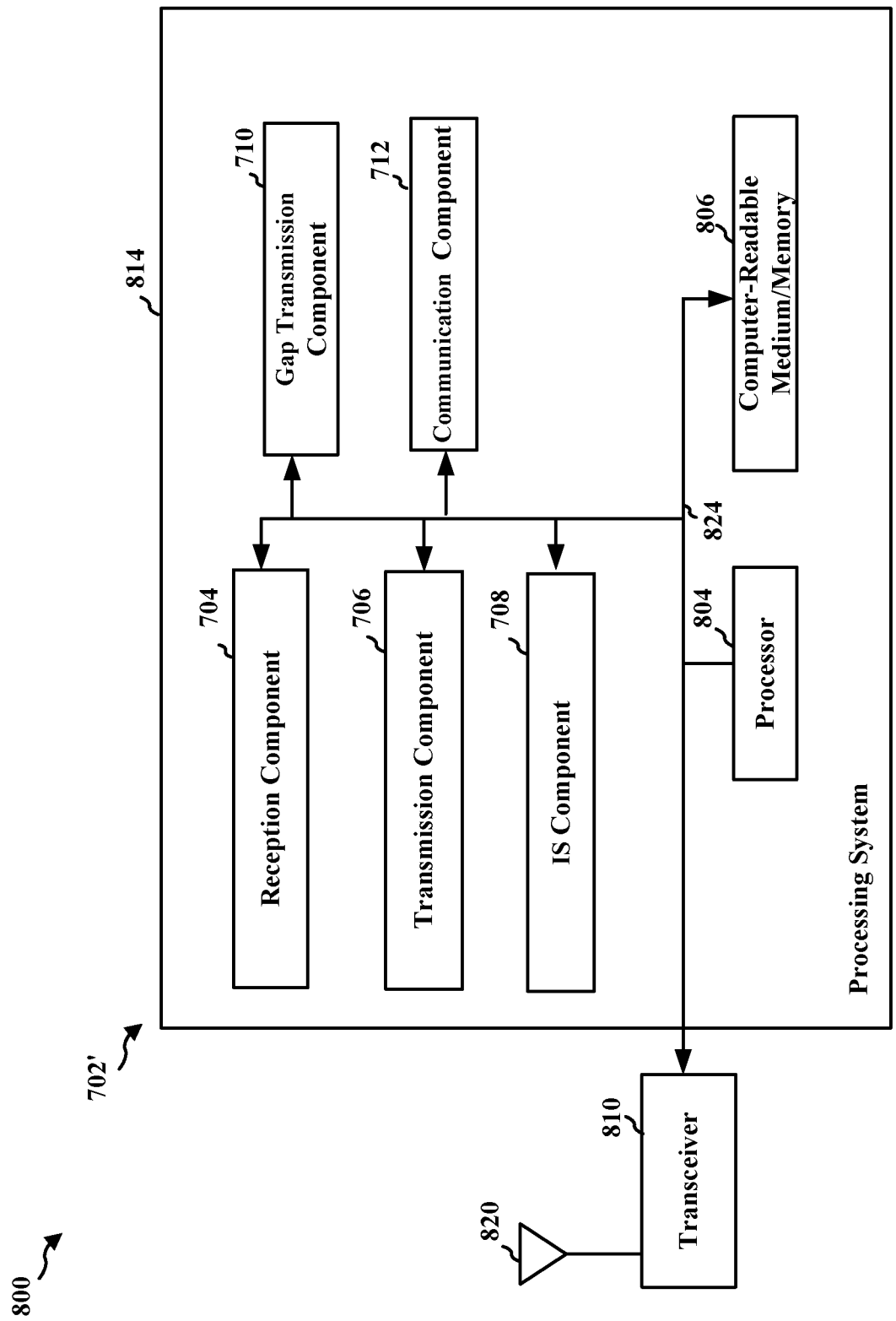
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712. The components may be software components running in the processor 804, resident/stored in the computer readable medium/memory 806, one or more hardware components coupled to the processor 804, or some combination thereof. The processing system 814 may be a component of the base station 310 and may include the memory 376 and/or at least one of the TX processor 316, the RX processor 370, and the controller/processor 375. Alternatively, the processing system 814 may be the entire base station (e.g., see 310 of FIG. 3).

In one configuration, the apparatus 702/702' for wireless communication includes means for transmitting an IS to a UE indicating communication to the UE within a COT and means for transmitting a gap transmission during the COT over a time period between the IS and the communication to the UE. The apparatus may further include means for transmitting the communication to the UE during the COT. In one configuration, the gap transmission may comprises information related to UE operation in the COT. In one configuration, the initial signal may indicate at least one beam for use in the COT. The aforementioned means may be one or more of the aforementioned components of the apparatus 702 and/or the processing system 814 of the apparatus 702' configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, the method comprising:
   transmitting an initial signal to a User Equipment (UE) indicating communication to the UE within a Channel Occupancy Time (COT);
   transmitting a gap transmission to maintain the COT over a first time period between the initial signal and the communication to the UE during a decoding time period for the UE to decode the initial signal; and
   transmitting the communication to the UE during the COT and following the decoding time period.

2. The method of claim 1, wherein the gap transmission comprises information related to UE operation in the COT.

3. The method of claim 2, wherein the gap transmission indicates a second time period for the UE to wake up during the COT.

4. The method of claim 2, wherein the gap transmission indicates a second time period during the COT for the communication to the UE.

5. The method of claim 2, wherein the gap transmission indicates a UE specific time period for each of multiple UEs to wake up during the COT.

6. The method of claim 5, wherein the gap transmission identifies each of the multiple UEs based on a UE identifier (ID).

7. The method of claim 5, wherein the gap transmission comprises a first indication of the first time period during the COT for the UE to wake up, and a second indication of a second time period during the COT for a second UE to wake up.

8. The method of claim 1, wherein the gap transmission comprises system information.

9. The method of claim 1, wherein the initial signal comprises information for the UE to receive the communication.

10. The method of claim 9, wherein the initial signal indicates at least one Control Resource Set (CORESET) for use in the COT.

11. The method of claim 9, wherein the initial signal indicates at least one beam for use in the COT.

12. The method of claim 1, wherein the communication comprises at least one of a grant or data transmitted to the UE during the COT.

13. The method of claim 1, wherein the gap transmission comprises a repetition of the initial signal.

14. The method of claim 1, wherein the initial signal comprises at least one of a Group Common Physical Downlink Control Channel (GC-PDCCH) or a Channel state information reference signal (CSI-RS).

15. An apparatus for wireless communication, comprising:
   means for transmitting an initial signal to a User Equipment (UE) indicating communication to the UE within a Channel Occupancy Time (COT);
   means for transmitting a gap transmission to maintain the COT over a first time period between the initial signal and the communication to the UE during a decoding time period for the UE to decode the initial signal; and
   means for transmitting the communication to the UE during the COT and following the decoding time period.

16. The apparatus of claim 15, wherein the gap transmission comprises information related to UE operation in the COT.

17. The apparatus of claim 16, wherein the gap transmission indicates at least one of a second time period for the UE to wake up during the COT, a third time period during the COT for the communication to the UE, or time periods for each of multiple UEs to wake up during the COT.

18. An apparatus for wireless communication, comprising:
   a memory; and
   at least one processor coupled to the memory and configured to:
      transmit an initial signal to a User Equipment (UE) indicating communication to the UE within a Channel Occupancy Time (COT);
      transmit a gap transmission to maintain the COT over a first time period between the initial signal and the communication to the UE during a decoding time period for the UE to decode the initial signal; and
      transmit the communication to the UE during the COT and following the decoding time period.

19. The apparatus of claim 18, wherein the gap transmission comprises information related to UE operation in the COT.

20. The apparatus of claim 19, wherein the gap transmission indicates a second time period for the UE to wake up during the COT.

21. The apparatus of claim 19, wherein the gap transmission indicates a second time period during the COT for the communication to the UE.

22. The apparatus of claim 20, wherein the gap transmission indicates time periods for each of multiple UEs to wake up during the COT.

23. The apparatus of claim 18, wherein the gap transmission comprises system information.

24. The apparatus of claim 18, wherein the initial signal comprises information for the UE to receive the communication.

25. The apparatus of claim 24, wherein the initial signal indicates at least one Control Resource Set (CORESET) for use in the COT or at least one beam for use in the COT.

26. The apparatus of claim 18, wherein the gap transmission comprises a repetition of the initial signal.

27. The apparatus of claim 18, wherein the initial signal comprises at least one of a Group Common Physical Downlink Control Channel (GC-PDCCH) or a Channel state information reference signal (CSI-RS).

28. A non-transitory computer-readable medium storing computer executable code, the code when executed by a processor cause the processor to:
   transmit an initial signal to a User Equipment (UE) indicating communication to the UE within a Channel Occupancy Time (COT);
   transmit a gap transmission to maintain the COT over a first time period between the initial signal and the communication to the UE during a decoding time period for the UE to decode the initial signal; and transmit the communication to the UE during the COT and following the decoding time period.

\* \* \* \* \*